United States Patent
Stanich et al.

(10) Patent No.: US 11,283,936 B1
(45) Date of Patent: Mar. 22, 2022

(54) INK USAGE ESTIMATION FOR EACH DROP SIZE BASED ON HISTOGRAM AND CALIBRATED DROP FRACTION

(71) Applicants: Mikel Stanich, Boulder, CO (US); Nikita Gurudath, Boulder, CO (US); Pallavi Premkumar, Boulder, CO (US); Ziling Zhang, Boulder, CO (US)

(72) Inventors: Mikel Stanich, Boulder, CO (US); Nikita Gurudath, Boulder, CO (US); Pallavi Premkumar, Boulder, CO (US); Ziling Zhang, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/126,659

(22) Filed: Dec. 18, 2020

(51) Int. Cl.
| | | |
|---|---|---|
| *H04N 1/00* | (2006.01) | |
| *G03G 15/08* | (2006.01) | |
| *G06K 9/46* | (2006.01) | |
| *B41J 2/175* | (2006.01) | |
| *H04N 1/23* | (2006.01) | |

(52) U.S. Cl.
CPC ...... *H04N 1/00068* (2013.01); *B41J 2/17566* (2013.01); *G03G 15/0856* (2013.01); *G06K 9/4642* (2013.01); *H04N 1/00015* (2013.01); *H04N 1/00034* (2013.01); *H04N 1/00076* (2013.01); *H04N 1/00408* (2013.01);
(Continued)

(58) Field of Classification Search
None
See application file for complete search history.

(56) References Cited

U.S. PATENT DOCUMENTS 5,812,156 A * 9/1998 Bullock ............... B41J 2/16538
347/14
6,554,388 B1 4/2003 Wong et al.
(Continued)

FOREIGN PATENT DOCUMENTS

CN 108031573 A 5/2018
EP 0454448 10/1991
(Continued)

OTHER PUBLICATIONS

Link, N., & Semiat, R. (2009). Ink drop motion in wide-format printers: I. Drop flow from Drop-On-Demand (DOD) printing heads. Chemical Engineering and Processing: Process Intensification, 48(1), 68-83.
(Continued)

*Primary Examiner* — Scott A Rogers
(74) *Attorney, Agent, or Firm* — Jaffery Watson Mendonsa & Hamilton LLP

(57) ABSTRACT

A system is disclosed. The system at least one physical memory device to store ink estimation logic and one or more processors coupled with the at least one physical memory device, to execute the ink estimation logic to receive a histogram for each of a plurality of color planes, receive uncalibrated drop fraction data for each of a plurality of drop sizes in a printing system, perform a direct drop fraction conversion of the uncalibrated drop fraction data to generate calibrated drop fraction data for each of the plurality of drop sizes by applying a first transfer function to the uncalibrated drop fraction data and generate estimated ink usage data for each of the plurality of drop sizes based on the histograms and the calibrated drop fraction data.

20 Claims, 10 Drawing Sheets

(52) U.S. Cl.
CPC ..... *H04N 1/00477* (2013.01); *H04N 1/00954* (2013.01); *H04N 1/2346* (2013.01)

(56) References Cited

U.S. PATENT DOCUMENTS

| | | |
|---|---|---|
| 7,423,778 B2 | 9/2008 | Hersch et al. |
| 8,100,057 B2 | 1/2012 | Hartmann et al. |
| 8,576,450 B2 | 11/2013 | Shepherd et al. |
| 8,734,034 B2 | 5/2014 | Morovic et al. |
| 8,923,713 B2 | 12/2014 | Terao et al. |
| 9,056,485 B2 | 6/2015 | Szafraniec |
| 9,096,056 B2 | 8/2015 | Zhou et al. |
| 9,102,157 B2 | 8/2015 | Prothon |
| 9,132,629 B2 | 9/2015 | Ward et al. |
| 9,656,463 B1 * | 5/2017 | Ernst ................ B41J 2/0456 |
| 9,785,873 B2 | 10/2017 | Stanich et al. |
| 9,832,428 B2 | 11/2017 | Hauf et al. |
| 10,129,436 B2 | 11/2018 | Kimura |
| 10,214,038 B2 | 2/2019 | Klinger |
| 10,237,452 B2 | 3/2019 | Rius Rossell et al. |
| 10,338,496 B2 | 7/2019 | Able et al. |
| 10,643,115 B1 | 5/2020 | Kailey |
| 2003/0179410 A1 | 9/2003 | Velde |
| 2013/0101328 A1 | 4/2013 | Morovic et al. |
| 2014/0210898 A1 | 7/2014 | Mantel et al. |
| 2017/0259560 A1 | 9/2017 | Sreenivasan et al. |
| 2018/0234582 A1 | 8/2018 | Stanich et al. |
| 2019/0224966 A1 | 7/2019 | Gracia Verdugo et al. |
| 2019/0268482 A1 | 8/2019 | Stanich et al. |
| 2019/0270304 A1 | 9/2019 | Stanich et al. |
| 2020/0012908 A1 | 1/2020 | Miyazaki et al. |
| 2020/0108621 A1 | 4/2020 | Ferreri et al. |
| 2021/0268794 A1 * | 9/2021 | Stanich ............ B41J 2/04535 |

FOREIGN PATENT DOCUMENTS

| | | |
|---|---|---|
| EP | 1106371 | 1/2006 |
| EP | 2313272 | 2/2010 |
| JP | 2018174143 | 11/2018 |
| WO | 2018022077 | 2/2018 |

OTHER PUBLICATIONS

Slavuj, R., Coppel, L. G., & Hardeberg, J. Y. (Feb. 2015). Effect of ink spreading and ink amount on the accuracy of the Yule-Nielsen modified spectral Neugebauer model. In Color Imaging XX: Displaying, Processing, Hardcopy, and Applications (vol. 9395, p. 93950E). International Society for Optics and Photonics.

Rius, M., Casaldàliga, M., Vargas, X. F., Quintero, X., Segura, R., & del Vallès, S. C. (Jan. 2015). Printer Calibrations for HP Large Format Page Wide Technology, In NIP & Digital Fabrication Conference (vol. 2015, No. 1, pp. 326-331). Society for Imaging Science and Technology.

Milder, O. B., Tarasov, D. A., & Titova, M. Y. (Mar. 2017). Inkjet printers linearization using 3D gradation curves. In CEUR Workshop Proceedings. Proceedings of the 1st International Workshop on Radio Electronics & Information Technologies (REIT 2017), Yekaterinburg, Russia (vol. 1814, pp. 74-83).

Jangra, A., Verma, S. & Boora, S. (2017). Identifying the Relationship Between Solid Ink Density and Dot Gain in Digital Printing, International Research Journal of Management Science & Technology, 8(3), 15-20. doi:10.32804/IRJMST. See highlighted and underlined sections.

Alamán, J. et al. (Nov. 2016). Inkjet Printing of Functional Materials for Optical and Photonic Applications. Materials 2016, 9(910). doi:10.3390/ma9110910. See highlighted and underlined sections.

Office Action from U.S. Appl. No. 16/804,727, dated Oct. 6, 2020, 9 pages.

Notice of Allowance from U.S. Appl. No. 16/804,727, dated Jan. 19, 2021, 9 pages.

* cited by examiner

INK USAGE ESTIMATION FOR EACH DROP SIZE BASED ON HISTOGRAM AND CALIBRATED DROP FRACTION

FIELD OF THE INVENTION

The invention relates to the field of printing systems, and in particular, to performing ink usage estimation for a printing system.

BACKGROUND

In commercial and transactional printers, it is common to estimate ink usage to determine one of the major components of the cost to print a job. Conventional ink estimation methods involve having to first perform a rasterization (or RIP) of the print job to produce a contone image, which is subsequently halftoned with the same halftone producing algorithms and settings to be employed by the targeted printer. The result is a bitmap from the halftoning operation that describes the resulting drop size for each pel. The bitmap encodes the different drop sizes using a unique symbol for each different drop size (e.g., level zero for no drop, one for small, two for medium and three for large).

In an actual printer this bitmap data would be the input to the drivers of ink jet printheads. Hence the data used in an actual printer is the same as the data used to estimate a print job. Since the drop sizes for an ink jet are known, the amount of ink required to print the job for each color may be calculated as the sum of ink for each drop size, page and color.

However, the above-described ink estimation process is computationally intensive. Accordingly, an improved mechanism to perform ink estimation is desired.

SUMMARY

In one embodiment, a method is disclosed. The method includes receiving a histogram for each of a plurality of color planes, receiving uncalibrated drop fraction data for each of a plurality of drop sizes in a printing system, performing a direct drop fraction conversion of the uncalibrated drop fraction data to generate calibrated drop fraction data for each of the plurality of drop sizes by applying a first transfer function to the uncalibrated drop fraction data and generating estimated ink usage data for each of the plurality of drop sizes based on the histograms and the calibrated drop fraction data.

BRIEF DESCRIPTION OF THE DRAWINGS

A better understanding of the present invention can be obtained from the following detailed description in conjunction with the following drawings, in which.

DETAILED DESCRIPTION

A mechanism to perform ink estimation for a printing system is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
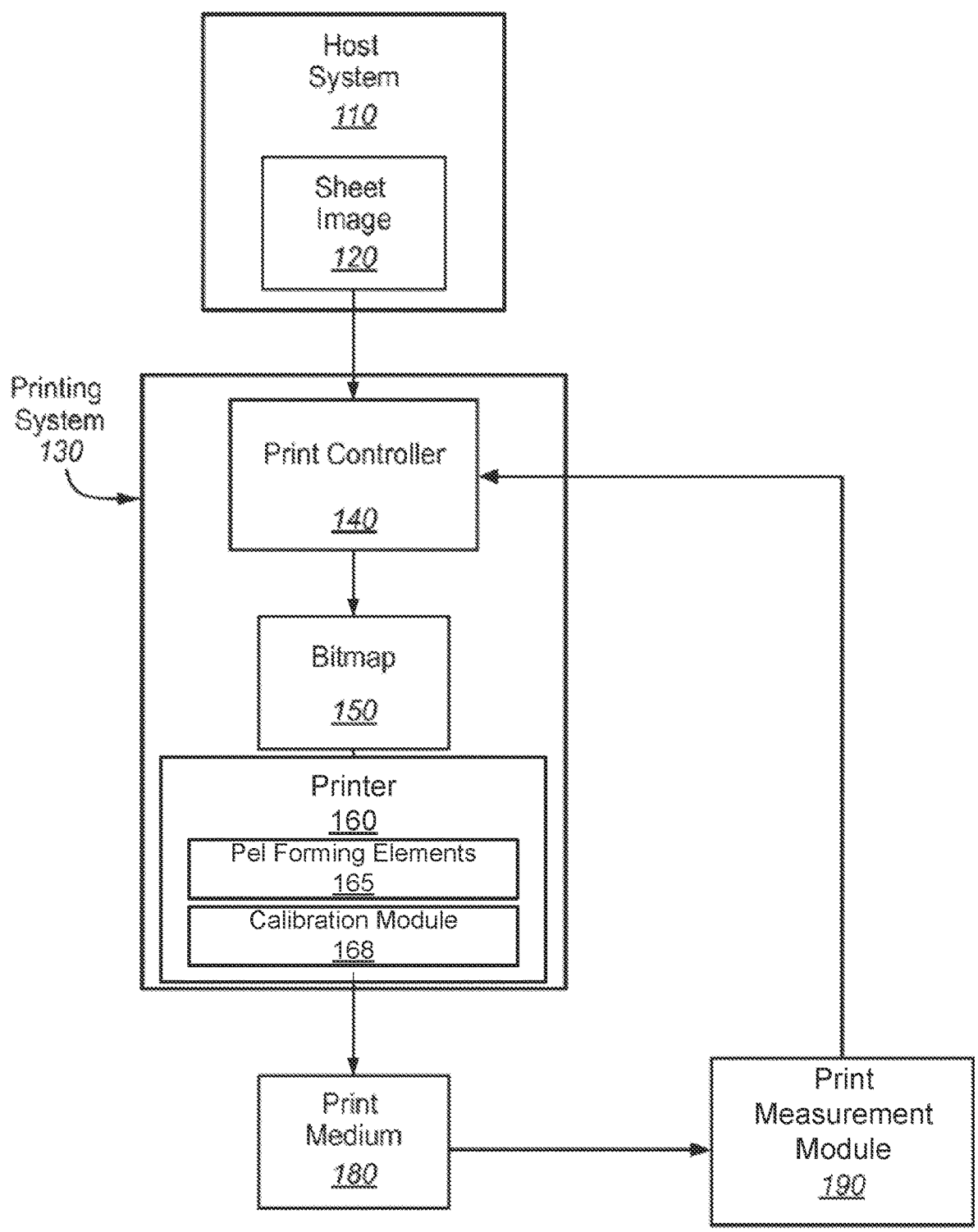
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type having specific drop sizes or discrete quantities of marking material associated with the pel forming elements.

In one embodiment, printer 160 comprises one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser).

The pel forming elements may be grouped onto one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. Print controller 140 and printer 160 may both be implemented in the same device or in separate devices with coupling.

Print measurement module 190 may be any system, device, software, circuitry and/or other suitable component operable to measure and process the spectral information of ink printed on medium 180 on a per color basis (e.g., print measurement data). In one embodiment, print measurement module 190 is implemented as a spectrophotometer to obtain print measurement data such as optical densities (OD) of the images of the test print job printed on medium 180. Print measurement module 190 communicates the print measurement data with print controller 140 to be used in processes such as determining an ink deposition curve.

An additional application of print measurement module 190 is to measure the printed output of the printer for the purpose of determining print engine calibration data and/or print engine uniformity data. The print measurement module 190 may be a stand-alone process, or may be integrated into the printing system 130.

Figure 2A:
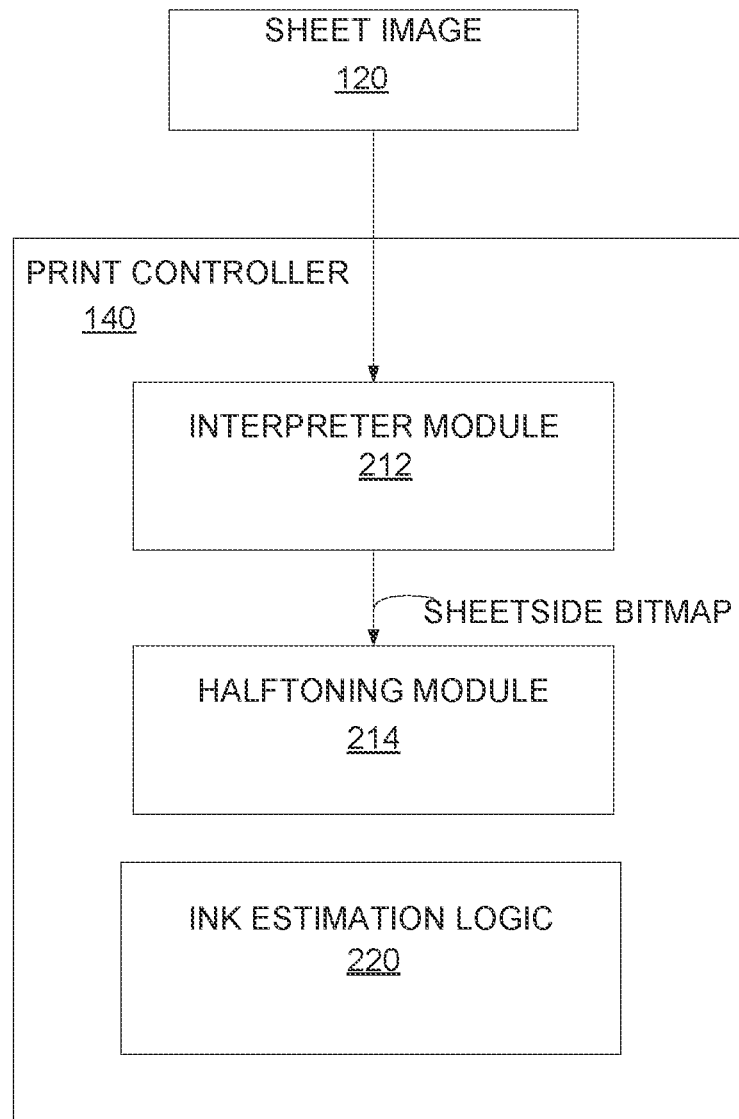
FIGS. 2A & 2B are block diagrams illustrating embodiment of a print controller.
Figure 2B:
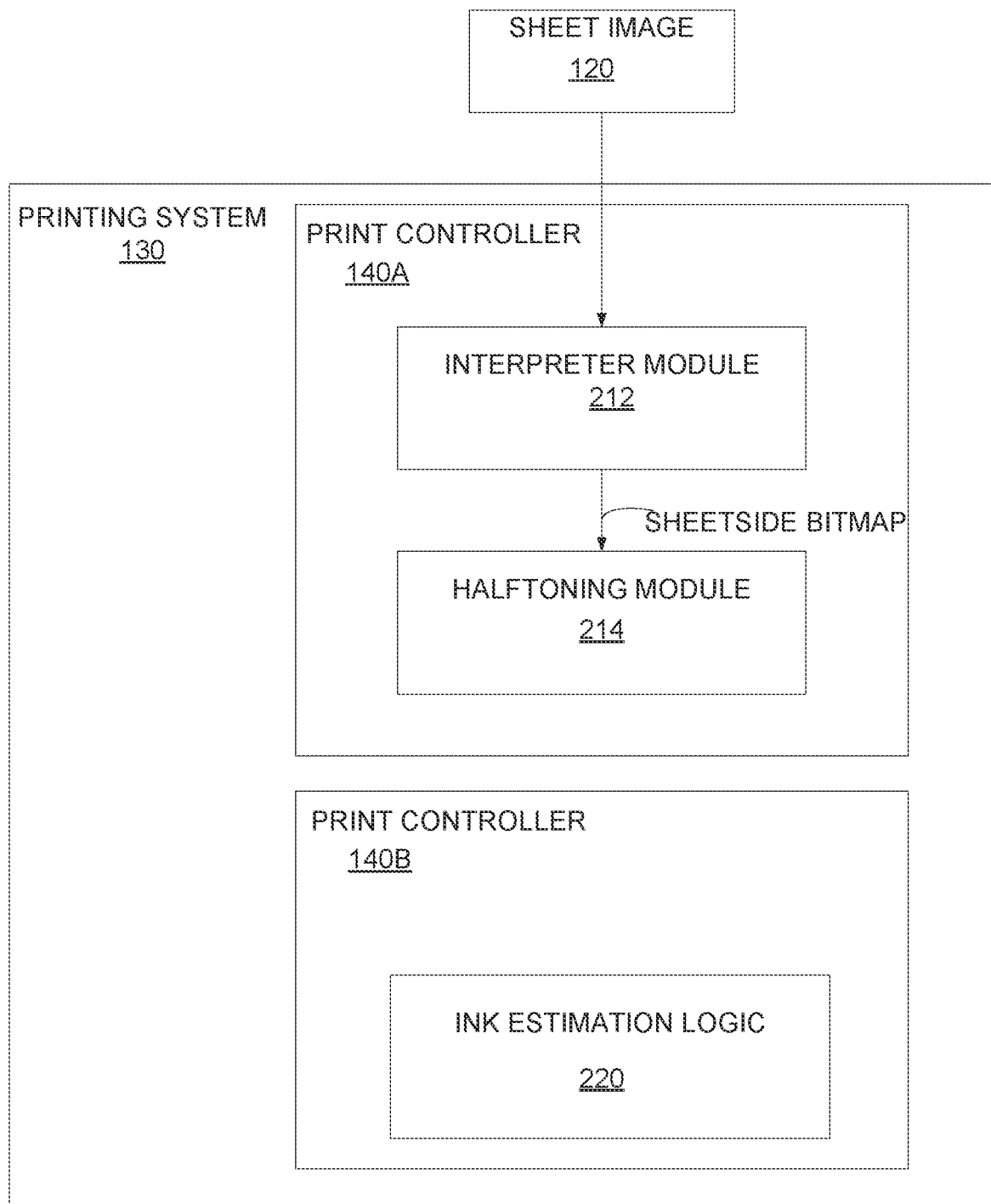

FIGS. 2A & 2B illustrate embodiments implementing print controllers 140. FIG. 2A illustrates a print controller 140 (e.g., DFE or digital front end), in its generalized form, including interpreter module 212, halftoning module 214 and ink estimation logic 220, while FIG. 2B illustrates an embodiment having print controllers 140A & 140B. In this embodiment, print controller 140A includes interpreter module 212 and halftoning module 214, and print controller 140B includes ink estimation logic 220. Print controllers 140A and 140B may be implemented in the same printing system 130 as shown or may be implemented separately with communicable coupling.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image.

Interpreter module 212 is operable to interpret or render multiple raw sheetsides concurrently so that the rate of rendering substantially matches the rate of imaging of production print engines. In one embodiment, the rate of rendering does not apply to stand alone ink estimation components since it is not actually driving a printer. In such an embodiment, the only requirement is producing an estimate in a reasonable amount of time.

Halftoning module 214 is operable to represent the sheetside bitmaps as halftone patterns of ink. For example, halftoning module 214 may convert the pels to halftone patterns of CMYK ink for application to the paper. A halftone design may comprise a pre-defined mapping of input pixel gray levels to output drop sizes based on pixel location. In one embodiment, the halftone design may include a finite set of transition thresholds between a finite collection of successively larger drop sizes, beginning with zero and ending with a maximum drop size (e.g., threshold arrays or multibit threshold arrays). In a further embodiment, halftoning module 214 performs the multi-bit halftoning using the halftone design (e.g. multi-bit threshold arrays (MTAs)).

To use threshold arrays for halftoning, each multibit threshold array is tiled across contone image data provided by the sheetside bitmap, which provides a set of threshold values for each pixel in the sheetmap. The contone image data (e.g., gray level data) is logically compared to the threshold data on a pixel basis. Planes (e.g., threshold array planes) represent threshold array values corresponding to a drop size (e.g., regions or transition between drop sizes). In the case of large drops, the large drops are produced by the halftoning when the contone image data is greater than the respective large threshold values in plane 1.

Medium drops are produced when the contone image data is greater than the medium drop plane 2 thresholds and also the contone image data is less than or equal to the large drop thresholds in plane 1. Small drops are produced when the contone image data is greater than the small drop thresholds in plane 3 and also the contone image data is less than or equal to the medium drop thresholds in plane 2.

Finally, the off/none drop size occurs for cases when the contone image data values are less than or equal to the small drop thresholds in plane 3. In this embodiment of a two-bit multibit printing system, this set of four logical equations, used with thresholds from each plane of the multibit threshold array permit each printing drop size to be defined for based on the contone image data values.

In other embodiments, the number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

Ink estimation logic 220 is implemented to provide an estimation of ink that is to be used to produce a print job. In such an embodiment, ink estimation logic 220 generates estimated ink usage data by computing a sum of ink usage data for each of a plurality of drop sizes generated by each pel forming element 165. In a further embodiment, ink estimation logic 220 uses histograms generated for each color plane (e.g., CMYK), as well as a calibrated drop fractions data, to estimate the print job ink usage. Although shown as being implemented in print controller 140, other embodiments may feature ink estimation logic 220 being implemented in any type of computing device, as discussed in more detail below.

Figure 3:
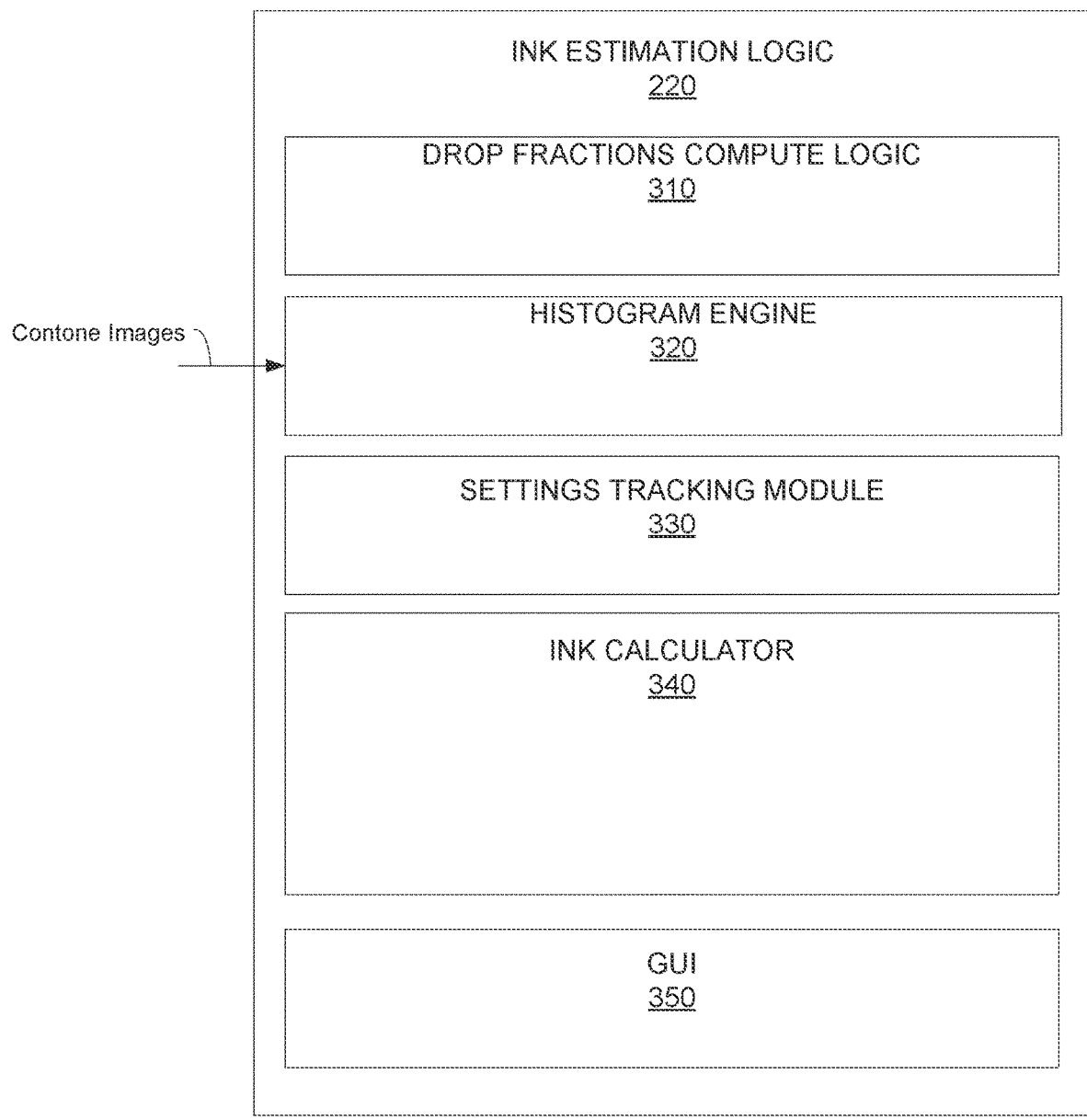
FIG. 3 illustrates one embodiment of ink estimation logic.

FIG. 3 illustrates one embodiment of ink estimation logic 220, including drop fractions compute logic 310, histogram engine 320, settings tracking module 330 and ink calculator

340. Drop fractions compute logic 310 is implemented to compute calibrated drop fraction data that is used to generate ink estimations.

Figure 4A:
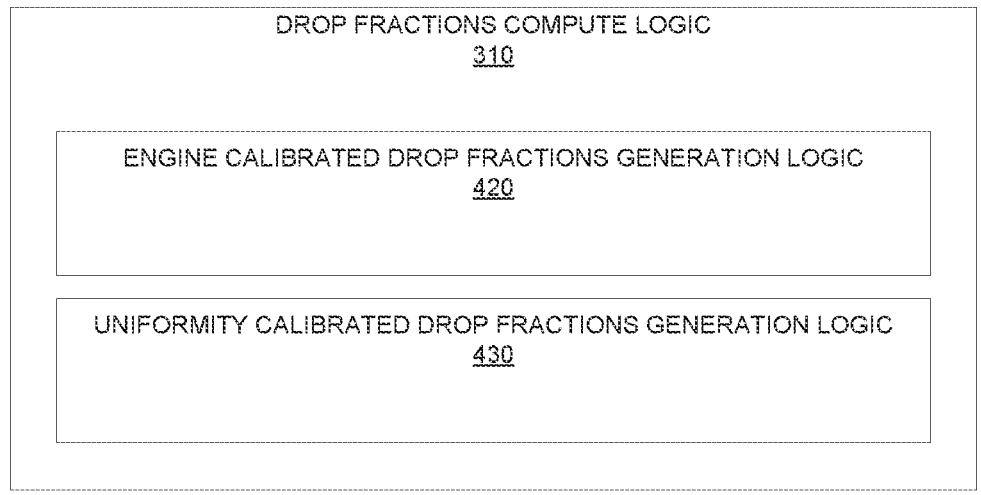
FIG. 4A illustrates one embodiment of drop fraction compute logic.

FIG. 4A illustrates one embodiment of drop fractions compute logic 310 including engine calibrated drop fractions generation logic 420. According to one embodiment, engine calibrated drop fractions generation logic 420 computes calibrated drop fraction data based on received uncalibrated drop fraction data. In such an embodiment, the uncalibrated drop fraction data is generated based on analysis of an uncalibrated halftone. A calibrated halftone is a halftone that has been adjusted to achieve a target response and so an uncalibrated halftone has not been adjusted to achieve a target response. Uncalibrated drop fractions represent percentages of a halftone threshold array for a specific drop size at each digital count (DC) level, where digital count is the gray level representing the pels in the bitmap 150, which ranges from 0-255 for a typical 8 bit system. DC is a print system input control and print system input control may be represented as DC, percent dot, or gray level.

To determine the uncalibrated drop fractions, an uncalibrated multibit threshold array may be analyzed to determine a number of drops (e.g., drop count) that occur at each DC or gray level. Thus, uncalibrated drop fractions are the number of drops in the threshold array for one drop size (e.g., small, medium, large and none) divided by the total number of drops for the one drop size in the threshold array, which is determined for each different drop size at each DC level.

The total number of drops for a single drop size is defined by the size of the threshold array. The total number of drops for a single drop size is the product of the number of rows and the number of columns in the threshold array. For example at DC level 100, if we have 10000 small drops and the array is 256×256, the uncalibrated small drop fraction is 10000/(256*256) or 0.153. The uncalibrated drop fraction for the none drop size is not necessary to compute. It can be used for verification since the sum of all uncalibrated drop fractions including none must be equal to one (100%). Uncalibrated drop fraction may be determined for each color plane based on the uncalibrated multibit threshold corresponding to each color plane.

Figure 4B:
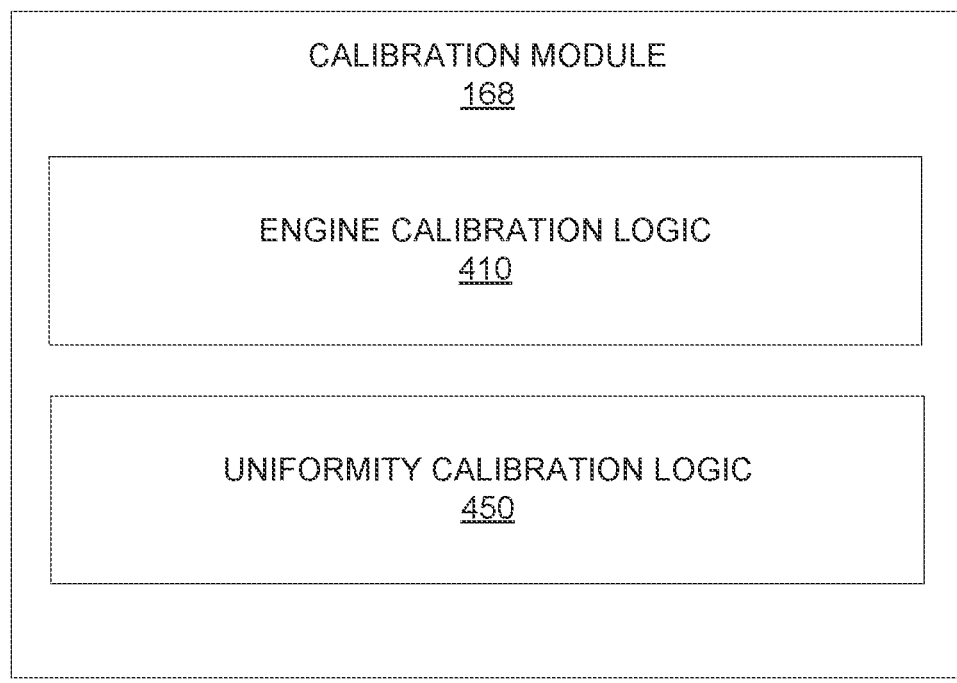
FIG. 4B illustrates one embodiment of a calibration module.

In one embodiment, the drop fractions compute logic 310 converts the uncalibrated drop fraction data to calibrated drop fraction data for each drop size based on print engine calibration data received from a calibration module 168 included in printer 160 (FIG. 1). FIG. 4B illustrates one embodiment of calibration module 168 including engine calibration logic 410. Engine calibration logic 410 generates a print engine calibration transfer function (or transfer function) for a plurality of nozzles (e.g., each print nozzle in the printhead array) based on the print engine calibration data that is used to convert the uncalibrated drop fraction data to the calibrated drop fraction data. A transfer function comprises a mapping of an input digital count to an output digital count for a system to achieve a target output, where digital count is the gray level or color value representing the pels in bitmap 150, where the input digital count values are transformed to output digital counts, which are used for calibrated printing. In this case, a single print engine calibration transfer function is generated for the plurality of print nozzles to obtain a single specific target output response for the plurality of print nozzles.

According to one embodiment, the calibrated drop fraction data is generated using a direct drop fraction conversion process. In such an embodiment, the direct drop fraction conversion process provides a direct conversion of uncalibrated drop fraction data to calibrated drop fraction data using the print engine calibration transfer function by mapping an input digital count to an output digital count, where the uncalibrated drop fraction data represents a mapping of the input digital count to respective uncalibrated drop fraction values.

Given OD(DC) as representing an uncalibrated optical density (OD) of the printer vs digital count, DC'=TF(DC) defines a transformation of digital count levels using a print engine calibration transfer function (TF) to produce modified levels (DC'), where TF is computed to transform the OD into a calibrated printer response OD'. Based on the above, OD'(DC)=OD(TF(DC)), where OD' is the calibrated target response of the printer. In a further embodiment, a printer functional relationship (e.g., XX(DC), where DC is the uncalibrated printer values) may be transformed into a calibrated printer relationship (XX') by using the transfer function. Thus, DF'(DC)=DF(TF(DC)) provides a calibrated drop fraction data (DF') derived from the DC of the uncalibrated drop fraction data DF and the printer transfer function.

Figure 5:
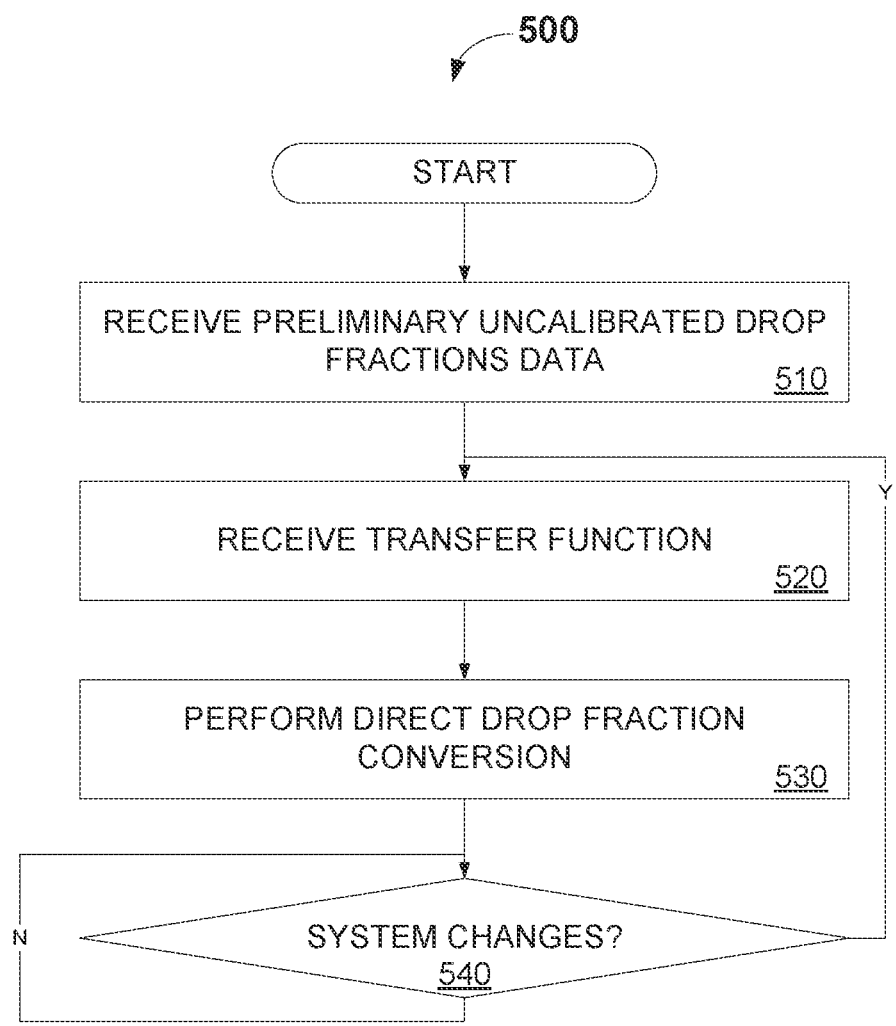
FIG. 5 is a flow diagram illustrating one embodiment of a process for generating calibrated drop fractions.

FIG. 5 is a flow diagram illustrating one embodiment of a direct process 500 for generating calibrated drop fractions (engine calibrated drop fractions and/or uniformity calibrated drop fractions). Process 500 may be performed by processing logic that may comprise hardware (e.g., circuitry, dedicated logic, programmable logic, etc.), software (such as instructions run on a processing device), or a combination thereof. In one embodiment, process 500 may be performed by calibrated drop fractions compute logic 310. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where uncalibrated drop fractions data may be received. In one embodiment, the uncalibrated drop fractions data is received from a storage device, such as memory. At processing block 520, the print engine calibration transfer function may be received. At processing block 530, the direct drop fraction conversion process is performed by applying the print engine calibration transfer function to the uncalibrated drop fraction data to generate the calibrated drop fraction data.

At decision block 540, a determination is made as to whether one or more printer system 130 changes have been detected that effect the ink estimation (e.g. printer transfer function and/or uncalibrated ink drop fractions). The printer transfer function achieves specific target response ODs for a given print medium 180 type (e.g., paper type). Upon a determination that the target response OD changes (e.g., to achieve a lighter or darker printing, or if the paper changes) a new transfer function corresponding to the change is generated or otherwise received.

Changes to the printer resolution may also require changing the printer transfer function, since this involves changing the applied halftone design. In the case where the halftone is changed, the uncalibrated drop fractions will also change. Printer system 130 changes may further occur due to inherent instability of the print engine due to continuous operation or external environmental effects like environment humidity, temperature, etc. Further, printer system 130 changes may occur due to deviations of the printer operation as certain factory or field print quality adjustments deteriorate with time or usage such as printhead voltage adjustment drift, engine calibration drift, uniformity drift, etc.

Upon a determination at decision block 540 that a printer system 130 change has occurred that effects the ink estimation (e.g., printer transfer function and/or the uncalibrated drop fractions), control is returned to processing block 520 where an updated transfer function and/or uncalibrated drop fractions that corresponds to the change is generated or otherwise received. Thus, printer system 130 characteristic changes that effect the transfer function and/or uncalibrated drop fractions comprise target OD, print medium 180, print resolution, environmental parameters, print quality adjustments, halftone design, tone curve, ink drop sizes and/or etc.

An extension of the concept of using calibrated drop fraction data derived from uncalibrated drop fractions using a single transfer function as in process 500 occurs when uniformity calibration (e.g., uniformity compensation) is employed. In this case, an individual uniformity calibration transfer function for each nozzle is generated to obtain a single specific target response for each individual printing nozzle in the printhead array. In doing so, the calibrated response for all nozzles is the same and hence the result response for the nozzles is uniform because of the uniformity calibration. By accounting for print system calibration (e.g., print engine calibration and/or uniformity calibration), ink estimation may be performed more accurately and/or efficiently.

The individual transfer functions from uniformity calibration transfer functions and the engine calibration transfer functions may be combined into a single transfer function for each nozzle. A cascading process to combine the transfer functions may be used. If the transfer functions for engine calibration and uniformity are reversed, the cascade operation is still valid. In other words, if the operations of uniformity calibration and engine calibration are interchanged, the cascading of transfer functions is still valid.

For improved ink estimation accuracy, the order of transfer function operations in the estimation process may match the order of the equivalent operations in the print system image processing path. Thus, $DF_i'(DC)=DF(TF2_i(TF1(DC)))$ provides a calibrated drop fraction data ($DF_i'$) for nozzle i derived from the DC of the uncalibrated drop fraction data DF and the printer transfer function TF1 and individual nozzle transfer functions for nozzle i $TF2_i$. This modification also requires that histogram data must be generated at a per nozzle basis. The estimate for ink then becomes an estimate for each individual nozzle which must be summed to obtain the total printing ink.

Referring to FIG. 4A, uniformity calibrated drop fractions generation logic 430 generates uniformity calibrated drop fraction data for each drop size and each nozzle once the calibrated drop fraction data has been generated. In one embodiment, the uniformity calibrated drop fraction data is generated based on the calibrated drop fraction data and uniformity calibration transfer function received from calibration module 168.

Using this two-step process, where the first drop fraction is derived using only engine calibration and a second set of drop fractions is determined using the uniformity calibration transfer functions $DF1'(DC)=DF(TF1(DC))$ provides a calibrated drop fraction data (DF1'), which includes engine calibration based on TF1. The second step then adds the impact of the uniformity calibration for each nozzle $DF_i'(DC)=DF1(TF2_i(DC))$ provides a calibrated drop fraction data ($DF_i'$) for nozzle i using the first drop fraction DF1 and the set of transfer functions from uniformity calibration $TF2_i$.

Referring to FIG. 4B, calibration module 168 includes uniformity calibration logic 450 to generate the uniformity calibration transfer functions. As used herein, uniformity calibration is defined as a calibration to compensate for measured response differences at a single pel, by a pel forming element 165 (e.g., print head nozzle). In one embodiment, the uniformity calibration transfer function includes a transfer function associated with each pel forming element.

Referring back to FIG. 4A, uniformity calibrated drop fractions generation logic 430 generates the uniformity calibrated drop fraction data by applying the uniformity calibration transfer function data to the drop fraction data. Once generated, the computed uniformity calibrated drop fraction data may be transmitted. In one embodiment, the data is transmitted to memory for storage. However, in other embodiments, the calibrated drop fractions data may be transmitted directly to ink calculator 340 for ink estimation.

Referring back to FIG. 3, histogram engine 320 generates a histogram (e.g., a distribution of a number of pels for every gray level) for each color plane of a received print job. In such an embodiment, a histogram is generated by receiving contone images corresponding to each color plane of the print job and performing a count of the total number of pels having the same digital count value for all pels from the set of images, over a total range of allowable digital count values (e.g., 0-255). For a contone image, the total number of grey levels per color plane=$2^n$, where n=bit depth. Accordingly, four histograms are generated to define all possible colors for a print job in the CMYK color space and still other planes (e.g., MICR or Protector Coat) may also have histograms generated. As mentioned above, the histogram may include data on a per nozzle basis for use with the uniformity calibration.

Settings tracking module 330 acquires and stores print job settings and printer system settings that are used in conjunction with the histograms to perform ink estimation. In one embodiment, the print job settings and printer system settings are received via a GUI 350 included for ink estimation logic 220. However other embodiments may comprise settings tracking module 330 receiving the print job settings information via a job ticket submitted with the print job and/or components of print controller 140.

In one embodiment, print job settings include information, such as scaling, n-up or other imposition, print quality/resolution, number copies, simplex/duplex. In a further embodiment, one or more of these print job settings may be included in a print job settings group (e.g., a job ticket). Moreover, many of the print job settings may already be accounted for in sheetmaps, such as imposition, resolution and number of copies. Printer system settings may include information for printer 160, such as the current calibrated ink deposition curve, print resolution, flushing type, post-processing marks, undercoat/overcoat type, ink selection, density mode, tone curve, print speed or the printer type/model. One or more of the printer system settings may also be included in a printer system settings group (e.g., a printer snapshot or printer profile).

Ink calculator 340 computes an estimated ink usage based on the color histogram, calibrated drop fraction data, print job settings and/or print system settings. According to one embodiment, ink calculator 340 computes a total volume of ink as a dot product of the histogram and the calibrated drop fraction data generated from the direct drop fraction conversion process. In the dot product case, the histogram and drop fraction data are ordered by their respective digital count values such that the product occurs between respective values having the same digital counts. In such an embodiment, the total volume of ink is computed on a per color plane basis. Thus, drop sizes combined with drop count information is used to estimate the amount of ink required to print a job (e.g., the estimated amount of ink is expressed as the number of each size drop or drop counts of each size drop).

In the case of uniformity calibrated drop fractions, total amount of ink at a per nozzle per color plane basis is computed using the dot product of the histogram and uniformity compensated drop fractions. The ink amounts for all nozzles and drop sizes may be combined to obtain ink usage for the entire print head array and/or print engine. Histograms in the uniformity calibration case are derived considering which nozzle is used to print specific columns of contone image data.

In a further embodiment, ink calculator 340 may provide ink estimates on a page level (e.g., for every page of a print job) for each color plane using the histogram data. In yet a further embodiment, ink estimates may be generated for each color plane, page, each nozzle and/or for each drop size using nozzle level data. Ink estimate amounts may be expressed ink drop size units (e.g., small medium or large drops) or in standard amount units (e.g., volume and/or mass such as liters, grams, etc.). The number of drops may be converted to standard amount units by multiplying the subject drop size standard amount times the number of drops of the subject drop size (e.g., multiply small drop size of X picoliters times the number of small drops Y) with repetition and summation to account for all drop sizes.

Figure 6:
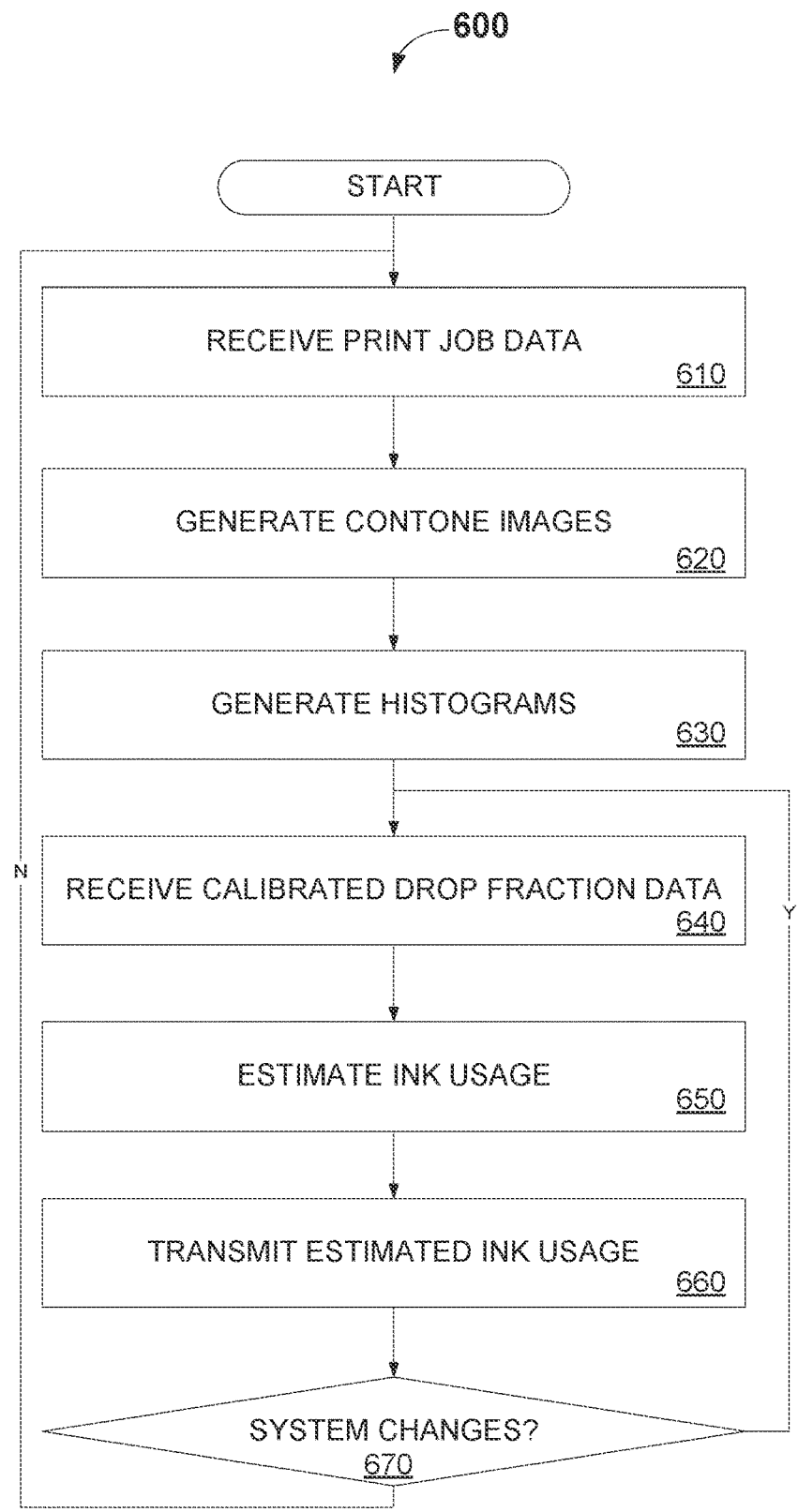
FIG. 6 is a flow diagram illustrating one embodiment of a process for performing an ink estimation.

FIG. 6 is a flow diagram illustrating one embodiment of a process 600 for performing ink estimation. Process 600 may be performed by processing logic that may comprise hardware (e.g., circuitry, dedicated logic, programmable logic, etc.), software (such as instructions run on a processing device), or a combination thereof. In one embodiment, process 600 may be performed by ink estimation logic 220. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 610, where print job data is received. In one embodiment, a job ticket (e.g., Job Definition Format (JDF)) is also received with the print job data. At processing block 620, contone images are received or generated based on the print job, and job ticket if included. At processing block 630, histograms are received or generated for each color plane and/or nozzle based on the contone images. At processing block 640, the calibrated drop fraction data is received, wherein the calibrated drop fractions may include the impact of uniformity calibration transfer functions and/or engine calibration transfer functions.

At processing block 650, the estimated amount of ink usage is computed based on the histograms and the calibrated drop fraction data. At processing block 660, the estimated ink usage data may be transmitted (e.g., reported). In one embodiment, estimated ink usage is displayed via GUI 350. However, in other embodiments, print controller 140 may transmit estimated ink usage data to an external computing device.

At decision block 670, a determination is made as to whether one or more print system 130 changes have been detected that effect the ink estimation (e.g., changes such as printer transfer function, the uncalibrated drop fractions, print job settings and/or printer system settings). If not, control is returned to processing block 610, where another print job is received. However, upon detection of such a print system 130 change, control is returned for execution of processing block 640, where updated uniformity drop fraction data and/or histogram data is received. In such an embodiment, the updated calibrated drop fraction data is generated by a subsequent implementation of the direct drop fraction conversion process to apply the changes (updated print engine calibration transfer function associated with the system change and/or updated uncalibrated drop fraction data) to generate calibrated drop fraction data, and continue to step 650. By accounting for print system 130 changes that effect the ink estimation, ink estimation may be performed more accurately and/or efficiently.

Although shown as a component of print controller 140, other embodiments may feature ink estimation logic 220 included within an independent device, or combination of devices, communicably coupled to print controller 140. For instance, FIG. 7 illustrates one embodiment of an ink estimation logic 220 implemented in a network 700.

Figure 7:
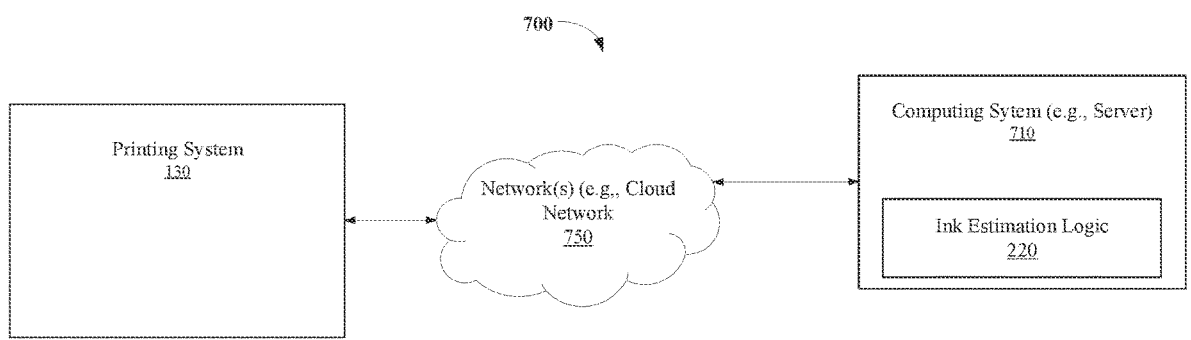
FIG. 7 illustrates one embodiment of a drop fractions compute logic implemented in a network.

As shown in FIG. 7, ink estimation logic 220 is included within a computing system 710 and transmits ink estimation data to printing system 130 (or other computer systems) via a cloud network 750. Printing system 130 receives the ink estimation data and displays it via GUI 350.

Figure 8:
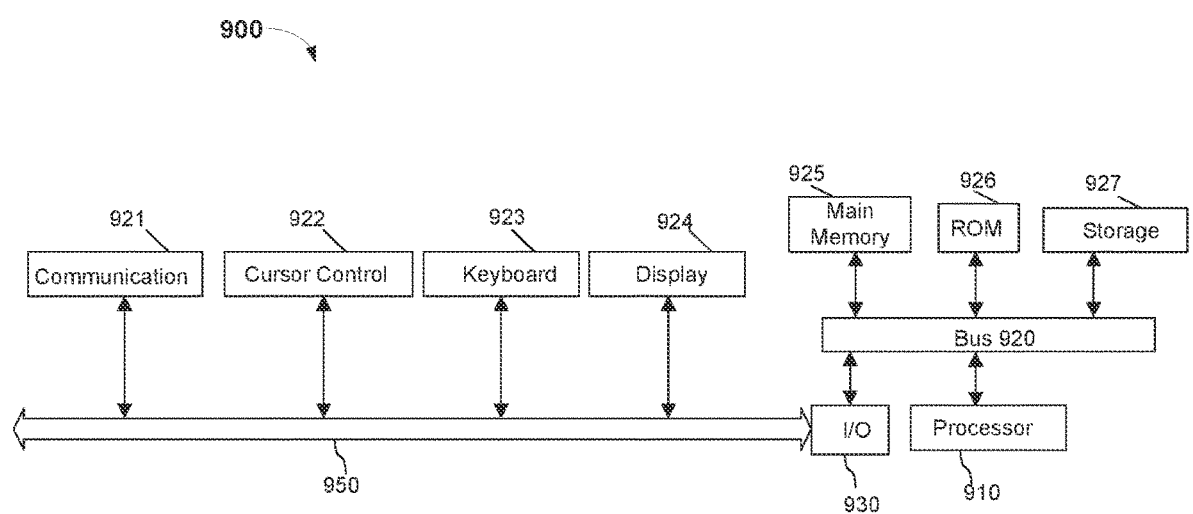
FIG. 8 illustrates one embodiment of a computer system.

FIG. 8 illustrates a computer system 900 on which printing host 110, printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard 923 (e.g., alphanumeric input device) and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store ink estimation logic and one or more processors coupled with the at least one physical memory device, to execute the ink estimation logic to receive a histogram for each of a plurality of color planes, receive uncalibrated drop fraction data for each of a plurality of drop sizes in a printing system, perform a direct drop fraction conversion of the uncalibrated drop fraction data to generate calibrated drop fraction data for each of the plurality of drop sizes by applying a first transfer function to the uncalibrated drop fraction data and generate estimated ink usage data for each of the plurality of drop sizes based on the histograms and the calibrated drop fraction data.

Example 2 includes the subject matter of Example 1, wherein the ink estimation logic generates the estimated ink usage data by computing a sum of ink usage data for each of the plurality of drop sizes generated by each of a plurality of pel forming elements in the printing system.

Example 3 includes the subject matter of Examples 1 and 2, wherein the ink estimation logic receives a second transfer function associated with each of the plurality of pel forming elements.

Example 4 includes the subject matter of Examples 1-3, wherein the ink estimation logic applies the second transfer functions associated with each of the plurality of pel forming elements to the calibrated drop fraction data to generate second calibrated drop fraction data for each of the plurality of drop sizes.

Example 5 includes the subject matter of Examples 1-4, wherein the ink usage data for each of the plurality of drop sizes is based on the histograms and the second calibrated drop fraction data.

Example 6 includes the subject matter of Examples 1-5, wherein the ink estimation logic transmits the estimated ink usage data.

Example 7 includes the subject matter of Examples 1-6, further comprising a graphical user interface to display the estimated ink usage data.

Example 8 includes the subject matter of Examples 1-7, further comprising a print controller comprising the physical memory device and the one or more processors to execute the ink estimation logic.

Some embodiments pertain to Example 9 that includes a method comprising receiving a histogram for each of a plurality of color planes, receiving uncalibrated drop fraction data for each of a plurality of drop sizes in a printing system, performing a direct drop fraction conversion of the uncalibrated drop fraction data to generate calibrated drop fraction data for each of the plurality of drop sizes by applying a first transfer function to the uncalibrated drop fraction data and generating estimated ink usage data for each of the plurality of drop sizes based on the histograms and the calibrated drop fraction data.

Example 10 includes the subject matter of Example 9, further comprising generating the estimated ink usage data by computing a sum of ink usage data for each of the plurality of drop sizes generated by each of a plurality of pel forming elements in the printing system.

Example 11 includes the subject matter of Examples 9 and 10, further comprising receiving a second transfer function associated with each of the plurality of pel forming elements.

Example 12 includes the subject matter of Examples 9-11, further comprising applying the second transfer functions associated with each of the plurality of pel forming elements to the calibrated drop fraction data to generate second calibrated drop fraction data for each of the plurality of drop sizes.

Example 13 includes the subject matter of Examples 9-12, wherein the ink usage data for each of the plurality of drop sizes is based on the histograms and the second calibrated drop fraction data.

Example 14 includes the subject matter of Examples 9-13, further comprising transmitting the estimated ink usage data.

Some embodiments pertain to Example 15 that includes at least one computer readable medium having instructions stored thereon, which when executed by one or more processors, cause the processors to receive a histogram for each of a plurality of color planes, receive uncalibrated drop fraction data for each of a plurality of drop sizes in a printing system, perform a direct drop fraction conversion of the uncalibrated drop fraction data to generate calibrated drop fraction data for each of the plurality of drop sizes by applying a first transfer function to the uncalibrated drop fraction data and generate estimated ink usage data for each of the plurality of drop sizes based on the histograms and the calibrated drop fraction data.

Example 16 includes the subject matter of Example 15, having instructions stored thereon, which when executed by one or more processors, further cause the processors to generate the estimated ink usage data by computing a sum of ink usage data for each of the plurality of drop sizes generated by each of a plurality of pel forming elements in the printing system.

Example 17 includes the subject matter of Examples 15 and 16, having instructions stored thereon, which when executed by one or more processors, further cause the processors to receive a second transfer function associated with each of the plurality of pel forming elements.

Example 18 includes the subject matter of Examples 15-17, having instructions stored thereon, which when executed by one or more processors, further cause the processors to apply the second transfer functions associated with each of the plurality of pel forming elements to the calibrated drop fraction data to generate second calibrated drop fraction data for each of the plurality of drop sizes.

Example 19 includes the subject matter of Examples 15-18, wherein the ink usage data for each of the plurality of drop sizes is based on the histograms and the second calibrated drop fraction data.

Example 20 includes the subject matter of Examples 15-19, having instructions stored thereon, which when executed by one or more processors, further cause the processors to transmit the estimated ink usage data.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store ink estimation logic; and
   one or more processors coupled with the at least one physical memory device, to execute the ink estimation logic to:
   receive a histogram for each of a plurality of color planes;
   receive uncalibrated drop fraction data for each of a plurality of drop sizes in a printing system;
   perform a direct drop fraction conversion of the uncalibrated drop fraction data to generate calibrated drop fraction data for each of the plurality of drop sizes by applying a first transfer function to the uncalibrated drop fraction data; and
   generate estimated ink usage data for each of the plurality of drop sizes based on the histograms and the calibrated drop fraction data.

2. The system of claim 1, wherein the ink estimation logic generates the estimated ink usage data by computing a sum of ink usage data for each of the plurality of drop sizes generated by each of a plurality of pel forming elements in the printing system.

3. The system of claim 2, wherein the ink estimation logic receives second transfer functions associated with each of the plurality of pel forming elements.

4. The system of claim 3, wherein the ink estimation logic applies the second transfer functions associated with each of the plurality of pel forming elements to the calibrated drop fraction data to generate second calibrated drop fraction data for each of the plurality of drop sizes.

5. The system of claim 4, wherein the ink usage data for each of the plurality of drop sizes is based on the histograms and the second calibrated drop fraction data.

6. The system of claim 2, wherein the ink estimation logic transmits the estimated ink usage data.

7. The system of claim 1, further comprising a graphical user interface to display the estimated ink usage data.

8. The system of claim 1, further comprising a print controller comprising the physical memory device and the one or more processors to execute the ink estimation logic.

9. A method comprising:
   receiving a histogram for each of a plurality of color planes;
   receiving uncalibrated drop fraction data for each of a plurality of drop sizes in a printing system;
   performing a direct drop fraction conversion of the uncalibrated drop fraction data to generate calibrated drop fraction data for each of the plurality of drop sizes by applying a first transfer function to the uncalibrated drop fraction data; and
   generating estimated ink usage data for each of the plurality of drop sizes based on the histograms and the calibrated drop fraction data.

10. The method of claim 9, further comprising generating the estimated ink usage data by computing a sum of ink usage data for each of the plurality of drop sizes generated by each of a plurality of pel forming elements in the printing system.

11. The method of claim 10, further comprising receiving second transfer functions associated with each of the plurality of pel forming elements.

12. The method of claim 11, further comprising applying the second transfer functions associated with each of the plurality of pel forming elements to the calibrated drop fraction data to generate second calibrated drop fraction data for each of the plurality of drop sizes.

13. The method of claim 12, wherein the ink usage data for each of the plurality of drop sizes is based on the histograms and the second calibrated drop fraction data.

14. The method of claim 10, further comprising transmitting the estimated ink usage data.

15. At least one non-transitory computer readable medium having instructions stored thereon, which when executed by one or more processors, cause the processors to:
   receive a histogram for each of a plurality of color planes;
   receive uncalibrated drop fraction data for each of a plurality of drop sizes in a printing system;
   perform a direct drop fraction conversion of the uncalibrated drop fraction data to generate calibrated drop fraction data for each of the plurality of drop sizes by applying a first transfer function to the uncalibrated drop fraction data; and
   generate estimated ink usage data for each of the plurality of drop sizes based on the histograms and the calibrated drop fraction data.

16. The computer readable medium of claim 15, having instructions stored thereon, which when executed by one or more processors, further cause the processors to generate the estimated ink usage data by computing a sum of ink usage data for each of the plurality of drop sizes generated by each of a plurality of pel forming elements in the printing system.

17. The computer readable medium of claim 16, having instructions stored thereon, which when executed by one or more processors, further cause the processors to receive second transfer functions associated with each of the plurality of pel forming elements.

18. The computer readable medium of claim 17, having instructions stored thereon, which when executed by one or more processors, further cause the processors to apply the second transfer functions associated with each of the plurality of pel forming elements to the calibrated drop fraction data to generate second calibrated drop fraction data for each of the plurality of drop sizes.

19. The computer readable medium of claim 18, wherein the ink usage data for each of the plurality of drop sizes is based on the histograms and the second calibrated drop fraction data.

20. The computer readable medium of claim 16, having instructions stored thereon, which when executed by one or more processors, further cause the processors to transmit the estimated ink usage data.

* * * * *